(12) United States Patent
Zhang et al.

(10) Patent No.: US 8,041,120 B2
(45) Date of Patent: Oct. 18, 2011

(54) UNIFIED DIGITAL INK RECOGNITION

(75) Inventors: Dongmei Zhang, Redmond, WA (US); Xiaohui Hou, Beijing (CN); Yingjun Qiu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 11/821,858

(22) Filed: Jun. 26, 2007

(65) Prior Publication Data
US 2009/0003703 A1 Jan. 1, 2009

(51) Int. Cl.
*G06K 9/46* (2006.01)
*G06K 9/66* (2006.01)

(52) U.S. Cl. .......................... 382/190; 382/159; 382/189

(58) Field of Classification Search .................. 382/188, 382/190; 707/3
See application file for complete search history.

(56) References Cited

U.S. PATENT DOCUMENTS

| | | | |
|---|---|---|---|
| 5,500,937 A | 3/1996 | Thompson-Rohrlich | |
| 5,613,019 A | 3/1997 | Altman et al. | |
| 5,666,438 A * | 9/1997 | Beernink et al. | 382/189 |
| 5,680,480 A | 10/1997 | Beernink et al. | |
| 5,742,705 A | 4/1998 | Parthasarathy | |
| 5,784,504 A | 7/1998 | Anderson et al. | |
| 5,796,867 A | 8/1998 | Chen et al. | |
| 5,832,474 A | 11/1998 | Lopresti | |
| 6,173,253 B1 | 1/2001 | Abe et al. | |
| 6,240,424 B1 | 5/2001 | Hirata | |
| 6,263,113 B1 | 7/2001 | Abdel-Mottaleb | |
| 6,389,435 B1 | 5/2002 | Golovchinsky | |
| 6,415,256 B1 * | 7/2002 | Ditzik | 704/231 |
| 6,512,995 B2 | 1/2003 | Murao | |
| 6,552,719 B2 | 4/2003 | Lui et al. | |
| 6,813,395 B1 | 11/2004 | Kinjo | |
| 6,965,384 B2 | 11/2005 | Lui et al. | |
| 7,031,555 B2 | 4/2006 | Troyanker | |
| 7,050,632 B2 | 5/2006 | Shilman et al. | |
| 7,136,082 B2 | 11/2006 | Saund et al. | |
| 7,167,585 B2 | 1/2007 | Gounares et al. | |
| 7,171,060 B2 | 1/2007 | Park | |
| 7,630,554 B2 * | 12/2009 | Napper et al. | 382/186 |
| 2002/0090148 A1 | 7/2002 | Pass | |

(Continued)

FOREIGN PATENT DOCUMENTS

KR  10-1993-0001471  2/1993

(Continued)

OTHER PUBLICATIONS

"CalliGrapher® 8.4 User's Guide", pp. 1-127.

(Continued)

*Primary Examiner* — Gregory M Desire

(57) ABSTRACT

Described is a unified digital ink recognizer that recognizes various different types of digital ink data, such as handwritten character data and custom data, e.g., sketched shapes, handwritten gestures, and/or drawn pictures, without further participation by a user such as recognition mode selection or parameter input. For a custom item, the output may be a Unicode value from a private use area of Unicode. Building the unified digital ink recognizer may include defining the data set to be recognized, extracting features of training samples corresponding to the dataset items to build a recognizer model, evaluating the recognizer model using testing data, and modifying the recognizer model using tuning data. The extracted features may be processed into feature data for a multi-dimensional nearest neighbor recognizer approach; the extracted features for the samples of each class is calculated and combined into the feature set for this class in the resulting recognizer model.

20 Claims, 9 Drawing Sheets

U.S. PATENT DOCUMENTS

| | | | |
|---|---|---|---|
| 2003/0007683 | A1 | 1/2003 | Wang et al. |
| 2003/0086627 | A1 | 5/2003 | Berriss et al. |
| 2004/0252888 | A1* | 12/2004 | Bargeron et al. ............ 382/188 |
| 2005/0091576 | A1 | 4/2005 | Relyea et al. |
| 2005/0102620 | A1 | 5/2005 | Seto |
| 2005/0201620 | A1 | 9/2005 | Kanamoto et al. |
| 2005/0222848 | A1 | 10/2005 | Mapper et al. |
| 2006/0001667 | A1 | 1/2006 | LaViola et al. |
| 2006/0036577 | A1 | 2/2006 | Knighton |
| 2006/0045337 | A1 | 3/2006 | Shilman et al. |
| 2006/0050969 | A1 | 3/2006 | Shilman et al. |
| 2006/0062461 | A1 | 3/2006 | Longe et al. |
| 2006/0110040 | A1 | 5/2006 | Simard et al. |
| 2006/0126936 | A1 | 6/2006 | Bhaskarabhatla |
| 2006/0149549 | A1* | 7/2006 | Napper .................... 704/257 |
| 2006/0197763 | A1 | 9/2006 | Harrison |
| 2006/0209040 | A1 | 9/2006 | Garside et al. |
| 2006/0277159 | A1* | 12/2006 | Napper et al. .................... 707/3 |
| 2007/0003142 | A1 | 1/2007 | Simard et al. |
| 2009/0002392 | A1 | 1/2009 | Hou |
| 2009/0003658 | A1 | 1/2009 | Zhang |

FOREIGN PATENT DOCUMENTS

| | | |
|---|---|---|
| WO | WO03/034276 | 4/2003 |

OTHER PUBLICATIONS

"The Evolution of Tablet PC Technologies in Microsoft Windows Vista", pp. 1-4.

Hse, et al., "Recognition and Beautification of Multi-Stroke Symbols in Digital Ink" pp. 1-7.

"Shape-searching software helps to avoid wasted design effort", Date: Jun. 21, 2007, http://www.engineerlive.com/features/17264/shapesearching-software-helps-to-avoid-wasted-design-effort.thtml.

Behiels, G. et al., "Statistical shape model-based segmentation of digital X-ray images", Date: 2000, pp. 61-68.

Kevin Durdle, "Supporting Mathematical Handwriting Recognition through an Extended Digital Ink Framework", Date: 2003.

Saund, et al., "A Perceptually-Supported Sketch Editor", Proceedings of the 7th annual ACM symposium on User Interface software and technology, ACM Press, New York, USA, Date: 1994, pp. 175-184.

Tang, et al., "Face photo recognition using sketch", Date: 2002, vol. 1, pp. I-257-I-260.

Wu Xiaojie, "Achieving Interoperability of Pen Computing with Heterogenous Devices and Digital Ink Formats", Date: Dec. 2004.

International Search Report and Written Opinion Received for PCT Application No. PCT/US2008/068251, mailed on Nov. 28, 2008, 11 pages.

International Search Report and Written Opinion; PCTUS2008/068252; dated Dec. 31, 2008.

"CalliGrapher® 8.4 User's Guide", pp. 1 - 127. 2006.

"The Evolution of Tablet PC Technologies in Microsoft Windows Vista", pp. 1-4. 2005.

Hse, et al., "Recognition and Beautification of Multi-Stroke Symbols in Digital Ink" pp. 1-7. 2005.

* cited by examiner

UNIFIED DIGITAL INK RECOGNITION

CROSS-REFERENCE TO RELATED APPLICATIONS

The present application is related to the following copending U.S. patent applications, assigned to the assignee of the present application, filed concurrently herewith and hereby incorporated by reference: "Digital Ink-Based Search," U.S. patent application Ser. No. 11/821,837, and "Integrated Platform for User Input of Digital Ink," U.S. patent application Ser. No. 11/821,870.

BACKGROUND

Digital ink can be used to represent many kinds of user input, such as handwritten characters, sketches, drawings, gestures, and so forth. Although it is easy for humans to distinguish the meanings of different kinds of digital ink input, it is difficult for a computer system to distinguish among them.

As a result, computer systems operate in separate modes with respect to digital ink processing, whereby in general, existing digital ink recognition technologies mainly focus on one kind of digital ink information at a time. For example, when in a character recognition mode, handwriting character recognition technologies can only recognize digital ink as characters, even when the digital ink does not intended to represent a character.

In many situations, users want to input different kinds of information when inputting digital ink to computer programs. However, existing digital ink recognition technologies are unable to differentiate such input, without specifically telling the program what the user intends to enter, that is, by manually changing input modes.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a unified digital ink recognizer that recognizes two or more different types of digital ink data is built. Such different types may include, for example, handwritten characters, sketched shapes, handwritten gestures, and/or drawn pictures. Upon receiving an input item, the recognizer outputs a value associated with one of the types of digital ink data. For a custom item of a defined dataset of items that the recognizer can recognize, the output may be a Unicode value from a private use area of Unicode.

In one aspect, building the unified digital ink recognizer may include using features of training samples corresponding to the dataset items to train a recognizer model. Building may further include evaluating the recognizer model using digital ink testing data, and modifying the recognizer model using digital ink tuning data. In one implementation, the features are extracted and processed (e.g., reduced) into data for a multi-dimensional nearest neighbor recognizer approach. Each set of data for a sample are classified into a recognizer model in association with a value (e.g., a Unicode value) representative of that set of feature-based data. Once built, when an input item is to be processed, the recognizer extracts and/or otherwise processes features of the input item to determine which data in the model the input item's data best matches, to output the matched data's associated recognition value.

In one aspect, a feature extraction mechanism featurizes digital ink data corresponding to training samples that represent at least two different types of digital ink data. A builder mechanism builds a recognizer model by persisting data representative of the features of each class of training sample in association with a recognition value of that class of training sample. An evaluation mechanism evaluates the recognition model using digital ink data testing samples, and an error analysis mechanism tunes the recognition model (e.g., based on the evaluation of the evaluation mechanism) using digital ink data tuning samples.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a unified digital ink recognition system that uniformly recognizes at least two different types of digital ink input. For example, once a unified digital ink recognizer is trained with the proper dataset, whether a user handwrites a character, sketches a shape, inputs a gesture, or draws a picture, the unified digital ink recognition technology correctly interprets the digital ink of the user input as what the user intended, at least to a high degree of accuracy.

In one implementation, there is described an example development process by a unified digital ink recognizer is built. One such example recognizer is able to recognize Chinese characters and some shapes (such as graphs, a triangle, a rectangle, a circle and the like). However, it is understood that this is only one example, as the technology described herein is not limited to any type of development process, nor to any particular type of algorithm, digital ink recognition or the like. Indeed, the described recognizer is extensible to recognizer many types of digital ink input.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, telephony and/or testing in general.

As described below with reference to FIGS. 1-4, a unified digital ink recognizer 102 is built. As part of the building process, a dataset of items that are to be recognized by the recognizer 102 is defined. For example, one such dataset comprises a set of Chinese characters and shapes, and contains 9,119 Chinese characters, corresponding to the Unicode range from 0x4e00 to 0x9FA5 (seldom used characters are removed), along with twenty-one shapes, corresponding to FIGS. 5-25, respectively. Note that the shapes may have additional accompanying information (not shown in FIGS. 5-25), such as axes labels, numeric unit labels accompanying the tick marks on the graph shapes, formulas (e.g., x=y for FIG. 5) and so forth.

For the shape set, the private use area of Unicode that can be customized, ranging from Unicode 0xF000 to 0xF0FF, is used. In this example, for each of the twenty-one shapes in the dataset, one Unicode value is used as the label to identify that shape, e.g., from 0xF000 to 0xF014 corresponding to FIGS. 5-25. For building a unified digital ink recognizer, any item to be recognized can be assigned with a Unicode value as its label from the private use area of Unicode, although an item with an already-assigned Unicode values (e.g., a character) can use that value.

Figure 1:
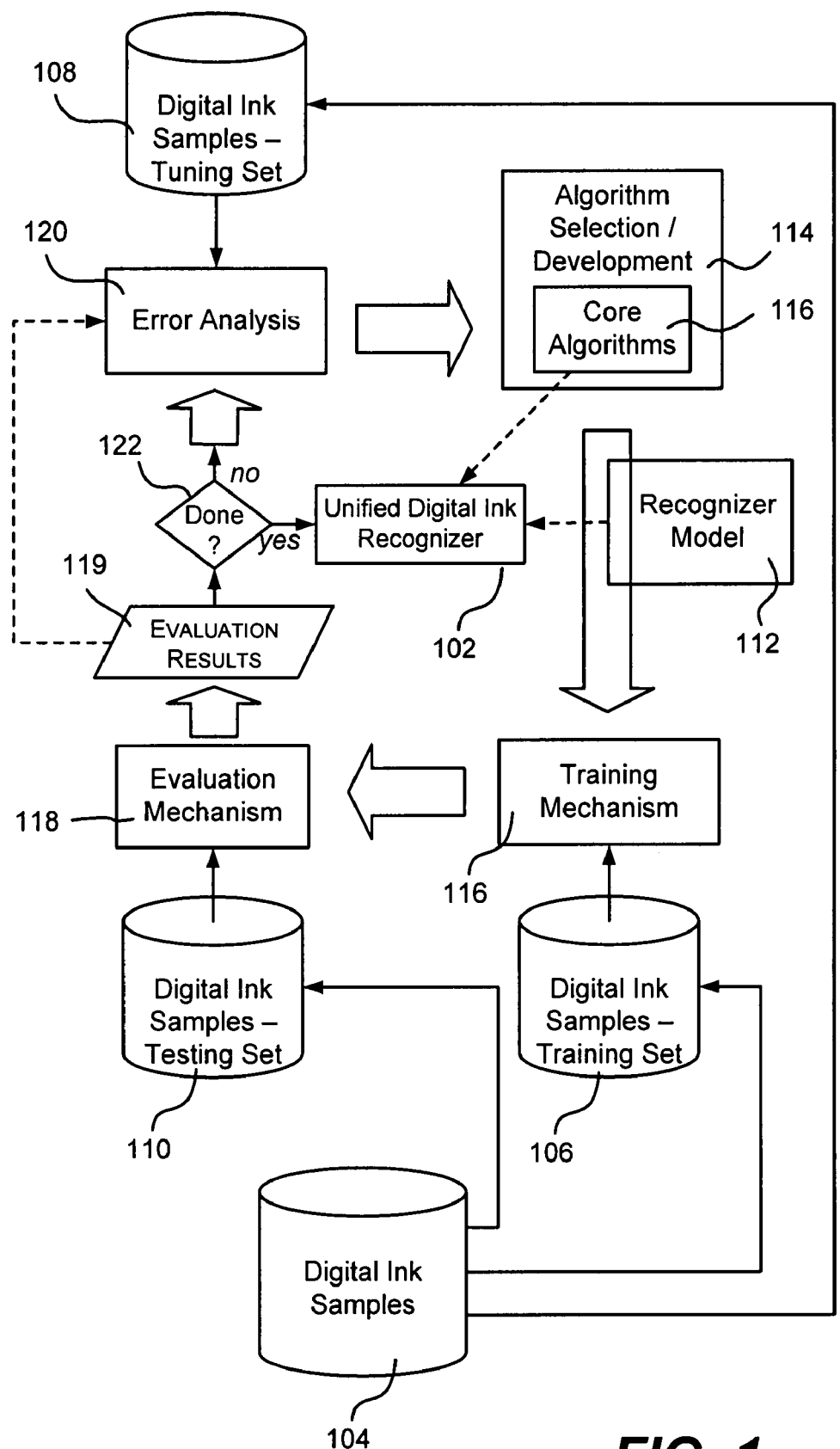
FIG. 1 is a block diagram representative of example components used to build a unified digital ink recognizer.

To build the unified digital ink recognizer 102, a learning based pattern recognition approach is used, as generally represented by the example components shown in FIG. 1. In general, this approach builds a classifier according to the features of different classes of items to be recognized. Via feature extraction, the features of each class of items are extracted from a collection of samples for that class.

With the classifier, given a new item to be recognized, the features of the item are matched with the feature of an existing class, which means the new item is recognized as belonging to that class.

One aspect of building a digital ink recognizer 102 with this approach is data collection of digital ink samples for each item in the defined dataset to be recognized by the digital ink recognizer 102. In the implementation represented in FIG. 1, the digital ink samples 102 are divided into three different datasets, comprising a training set 106, a testing set 110 and a tuning set 108. The training set 106 is used for building a recognizer model 112, the testing set 110 for testing the recognizer model 112, and the tuning set 108 for tuning the recognizer model 112 to improve its accuracy. In one example implementation, for building the recognizer model 112, five-hundred digital ink samples of handwriting were collected for each Chinese character in the training set, and one-hundred digital ink sketch samples were collected for each shape in the training set.

Based on the digital ink samples 104, a first mechanism (process step) 114 develops and/or selects a set of one or more core algorithms 116 for use in extracting the features of the training set 106 to build the digital ink recognizer model 112 according to the extracted features. The developed core algorithms are performed on the training set 106 to build the digital ink recognizer model 112.

Figure 2:
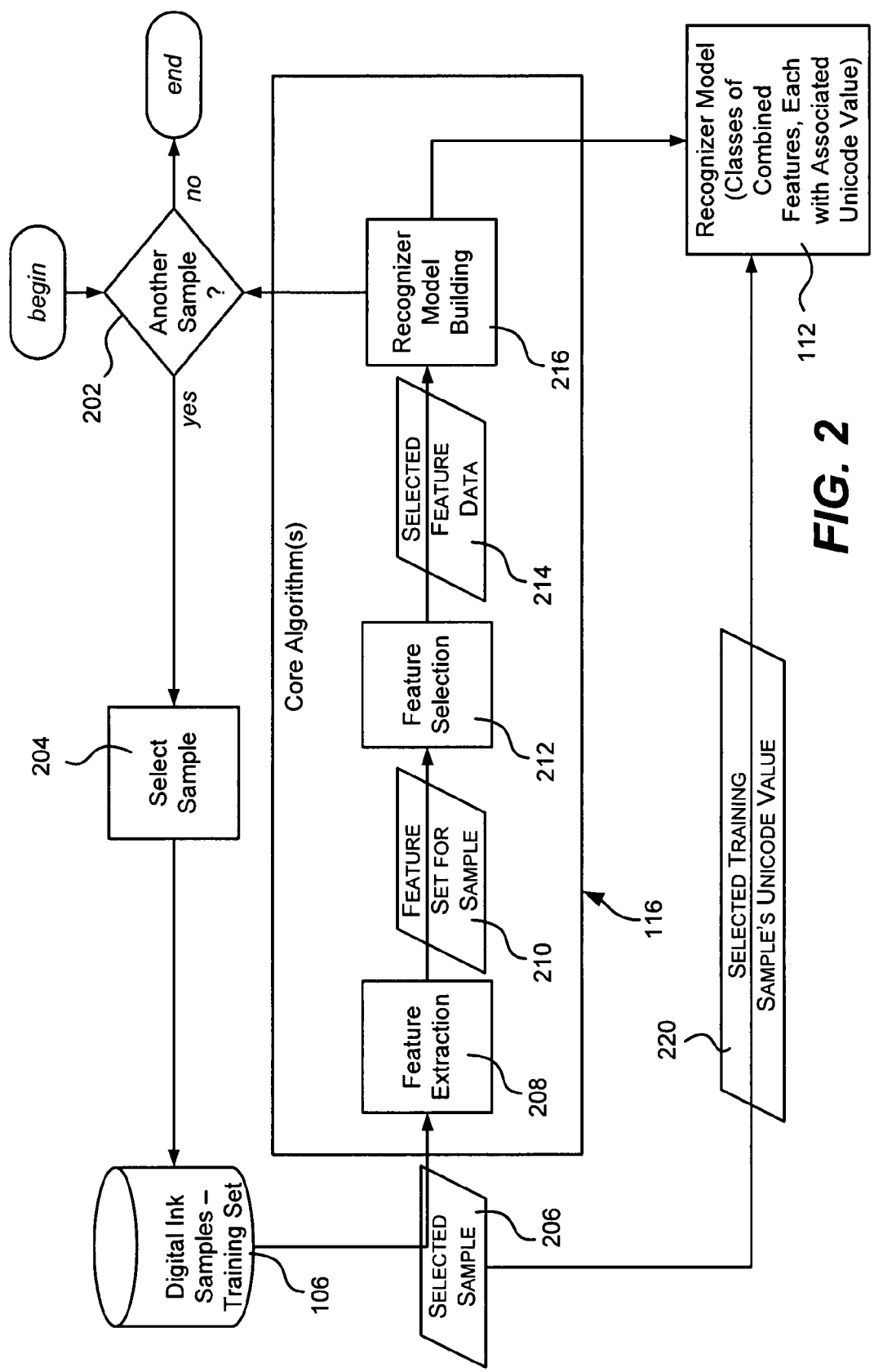
FIG. 2 is a block diagram representative of example components within a set of one or more core algorithms that may be used in building a unified digital ink recognizer.

More particularly, a recognition algorithm is used to build the recognizer model (classifier) 112 for the items to be recognized. As represented in FIG. 2 via blocks 202 and 204, for each selected training sample 206 of a set of training samples 106, the core algorithm 116 includes a feature extraction mechanism 208 that extracts a set of features 210. Further processing 212 may be performed on the feature set 210, such as feature selection (e.g., for nearest neighbor recognition, described below with reference to FIG. 3) into selected feature set 214. The feature set 214 is then combined with other such feature data for this sample's class to build (block 216) the recognizer model 112, by adjusting the combined feature data of the class to which this sample belongs based on the feature set 214.

As is known, there are many existing and possible recognition algorithms which may be used to build a recognition system, including nearest neighbor classification (sometimes referred to as k-nearest neighbor, or KNN), Gaussian Mixture Model (GMM), Hidden Markov Model (HMM), and so forth. In one implementation of the unified digital ink recognition system, nearest neighbor classification is used to recognize digital ink.

Figure 3A:
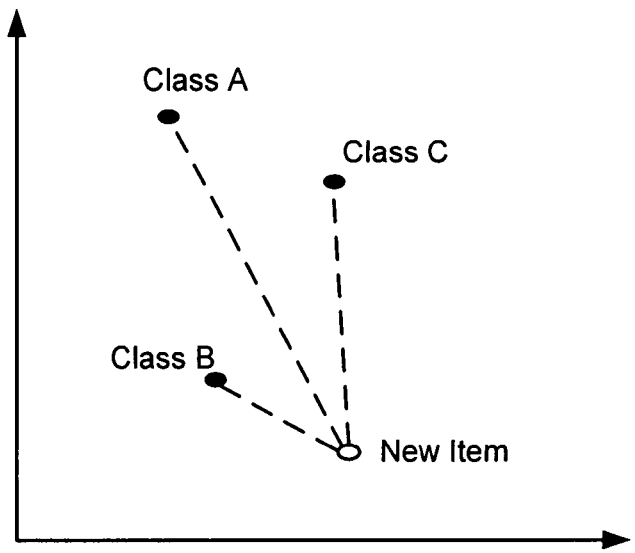
FIG. 3A is a visual representation of a core algorithm that recognizes a new item via nearness to a class within a recognition model built during training.

A primary concept in nearest neighbor classification is to use one point in multi-dimensional space to represent each class of samples, such as classes A-C as generally represented in FIG. 3A. In such an example, the class data is thus a set of coordinates in multiple (two or more) dimensional space.

Figure 3B:
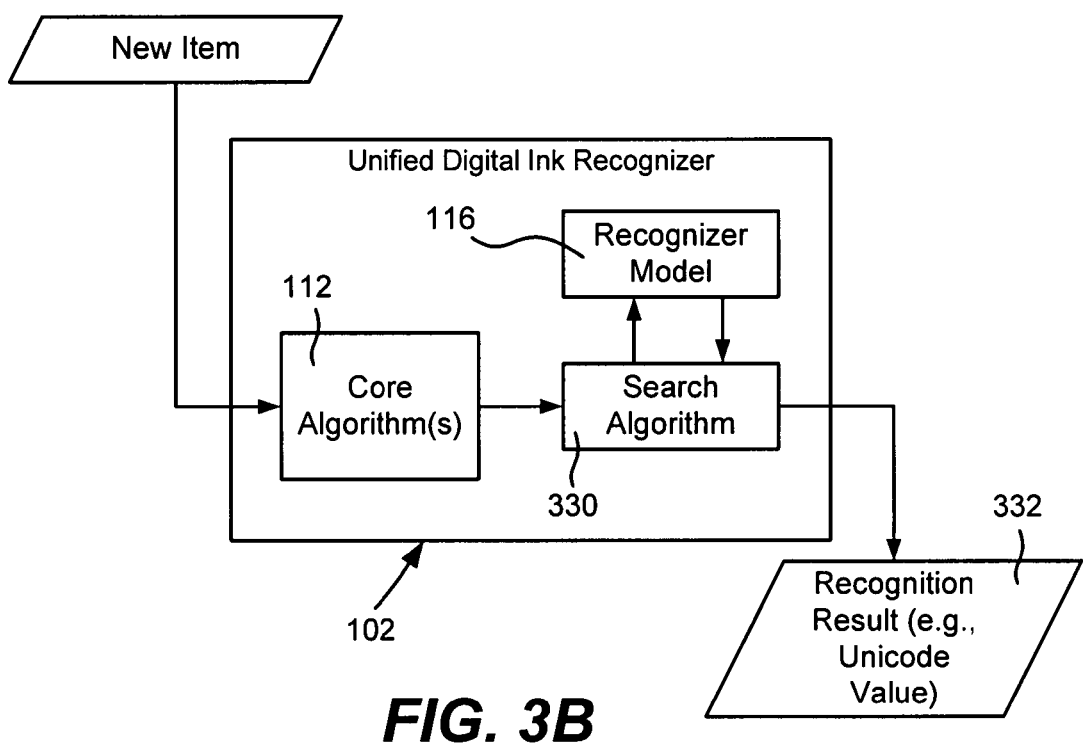
FIG. 3B is a block diagram representing recognition of a new item.

After the recognizer model 112 is built, when a new item "New Item" is to be recognized, that item is also represented by a point in this space. As represented in FIG. 3B, a search algorithm 330 performs computations (e.g., searches for a nearest neighbor) to find the nearest point relative to this new item's point, and recognizes this item as belonging to the class that is represented by the found search result, whereby the recognition result 332 (e.g., a Unicode value) is output. In the example of FIG. 3A, (in which only three classes are shown, and in only two dimensions for purposes of simplicity), it is readily apparent that the new item is nearest to the Class B, and thus would be recognized as whatever Unicode value corresponded to the Class B.

Returning to FIG. 1, the accuracy and efficiency of the unified digital ink recognizer model 112 may be evaluated via an evaluation mechanism 118 that operates using the testing set 116 of digital ink samples. Further, according to the evaluation results 119, some error analysis may be performed (block 120), by which the unified recognizer model 112 may be improved with the tuning set of digital ink samples 108. As represented via decision diamond 122, the process may be performed over and over to optimize the accuracy and efficiency of the unified recognizer model 112, until, for example, the evaluation results indicate an acceptable recognizer.

When complete, a unified digital ink recognizer 102 is provided, comprising the core algorithm or algorithms and the recognizer model 112. In one implementation, the unified digital ink recognizer can recognize digital ink of handwriting (e.g., Chinese characters) and sketching shapes (including sketched graphs). As a result, whether the user inputs a Chinese character by handwriting or inputs a shape by sketching, the unified digital ink recognizer correctly interprets the digital ink of the user's input as a character or as a shape.

Figure 4:
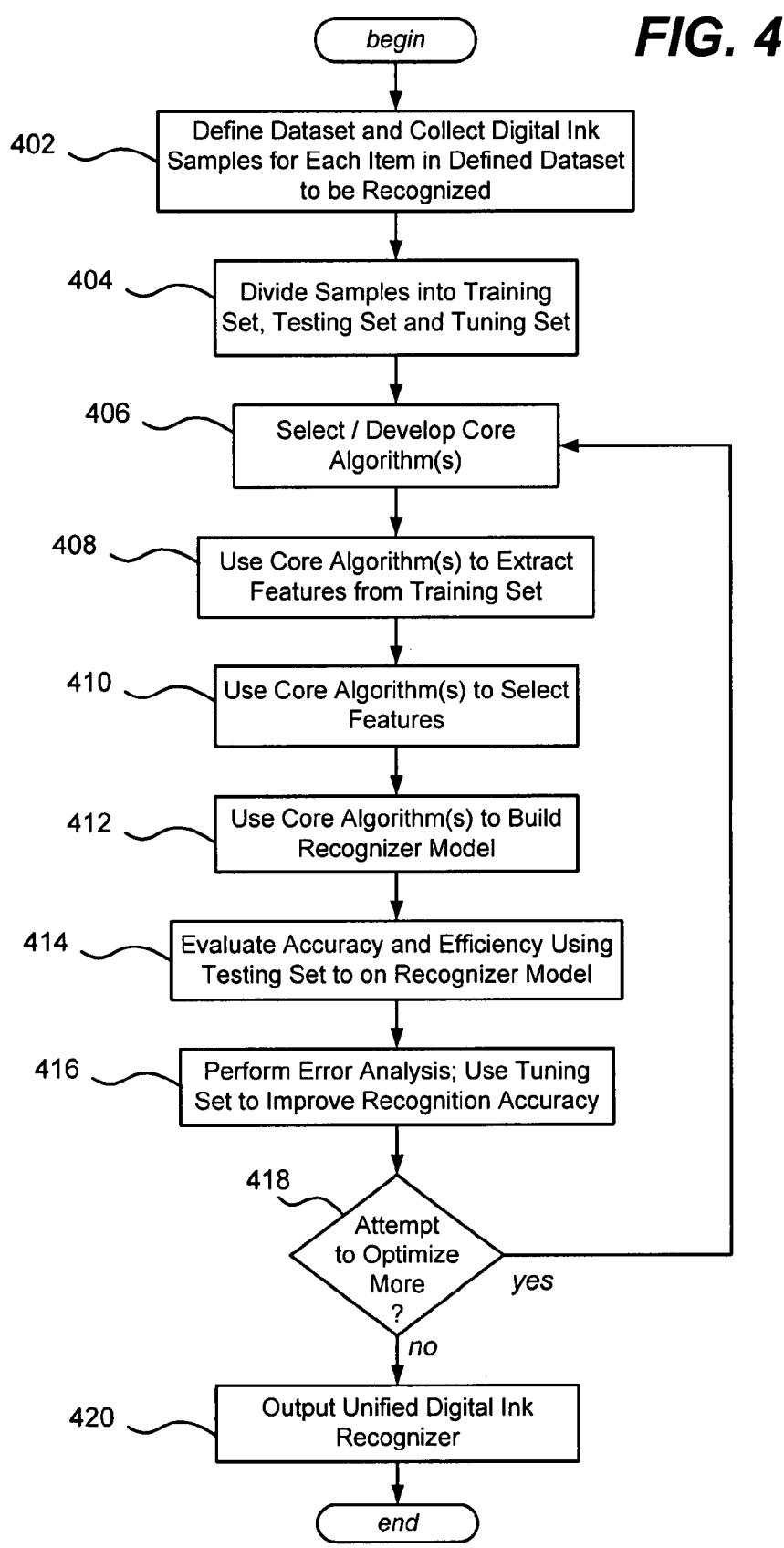
FIG. 4 is a flow diagram representing example steps that may be taken when building a unified digital ink recognizer.
Figure 5:
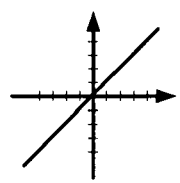
FIGS. 5-25 are representations of some example figures that may be recognized from a sketch via a unified digital ink recognizer.
Figure 6:
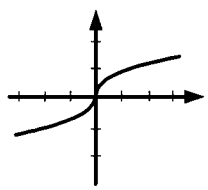
Figure 7:
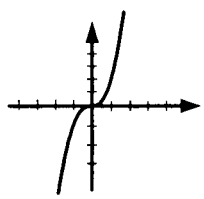
Figure 8:
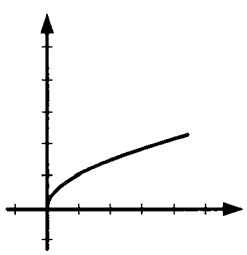
Figure 9:
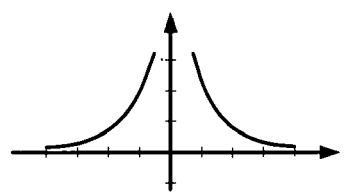
Figure 10:
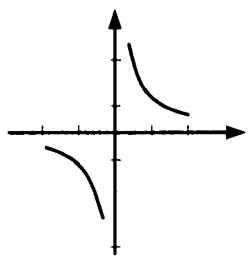
Figure 11:
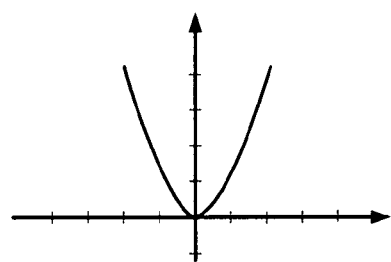
Figure 12:
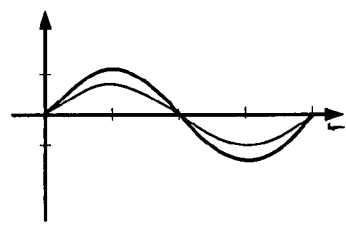
Figure 13:
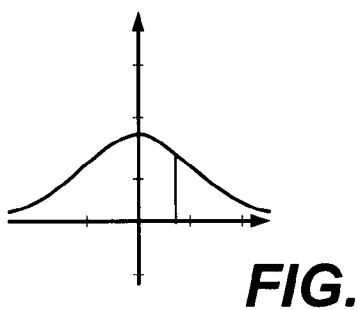
Figure 14:
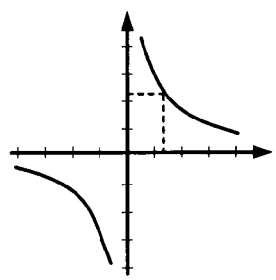
Figure 15:
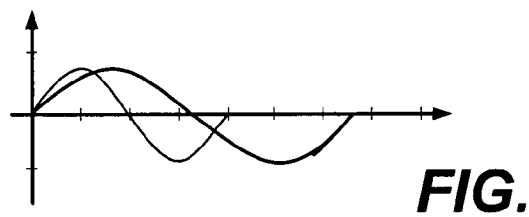
Figure 16:
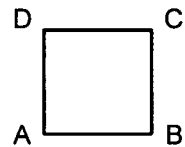
Figure 17:
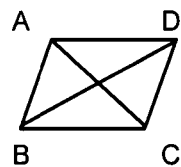
Figure 18:
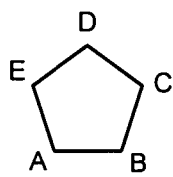
Figure 19:
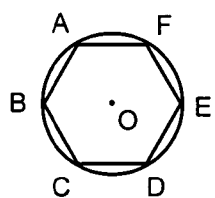
Figure 20:
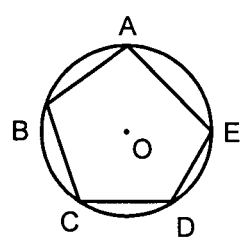
Figure 21:
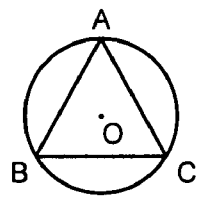
Figure 22:
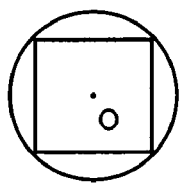
Figure 23:
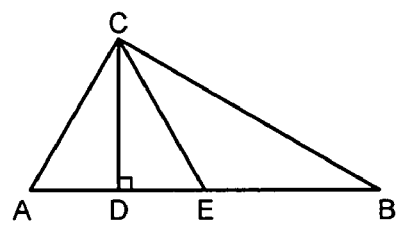
Figure 24:
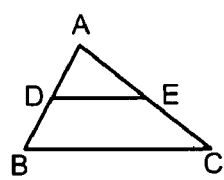
Figure 25:
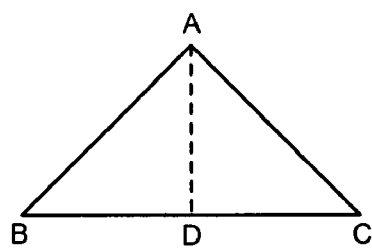

FIG. 4 summarizes how the unified digital ink recognition technology is built so as to uniformly recognize different kinds of information represented by digital ink, beginning at step 402 which represents defining the dataset of items to be recognized, and collecting the digital ink samples for those items. Step 404 represents dividing the digital ink samples into the training set, testing set and tuning set. Note that the samples may be divided randomly, or based on some other criteria, such as to put similar looking items in the tuning set. Step 406 represents selecting the core algorithms, e.g., determining which features to extract, and for nearest neighbor classification, which should be selected from those features, how much weight to give each feature, and so forth.

Step 408 represents using a feature extraction algorithm to extract the features from each selected item in the training set, with step 410 representing the feature selection algorithm, and step 412 representing the building of the recognizer model, e.g., processing the feature data of each selected item as needed to adjusting the feature data for the class [the class is identified by the Unicode value, the selected item is belonging to the class] in the recognizer model (such as representing multi-dimensional coordinates).

Step 414 represents the evaluation of the accuracy and/or efficiency using the testing set of digital ink samples. Based on an error analysis at step 416 as to how accurate and/or efficient the model is, samples from the tuning set may be applied at step 416 in an attempt to better optimize the recognizer. Step 418 represents repeating any or all of steps 406, 408, 410, 412, 414 and 416 for further optimization. Note that the evaluation at step 414 may be used to determine whether further optimization is necessary. Further, note that a model that is less accurate and/or efficient than another model may be discarded until the best model of those evaluated is determined.

Exemplary Operating Environment

Figure 26:
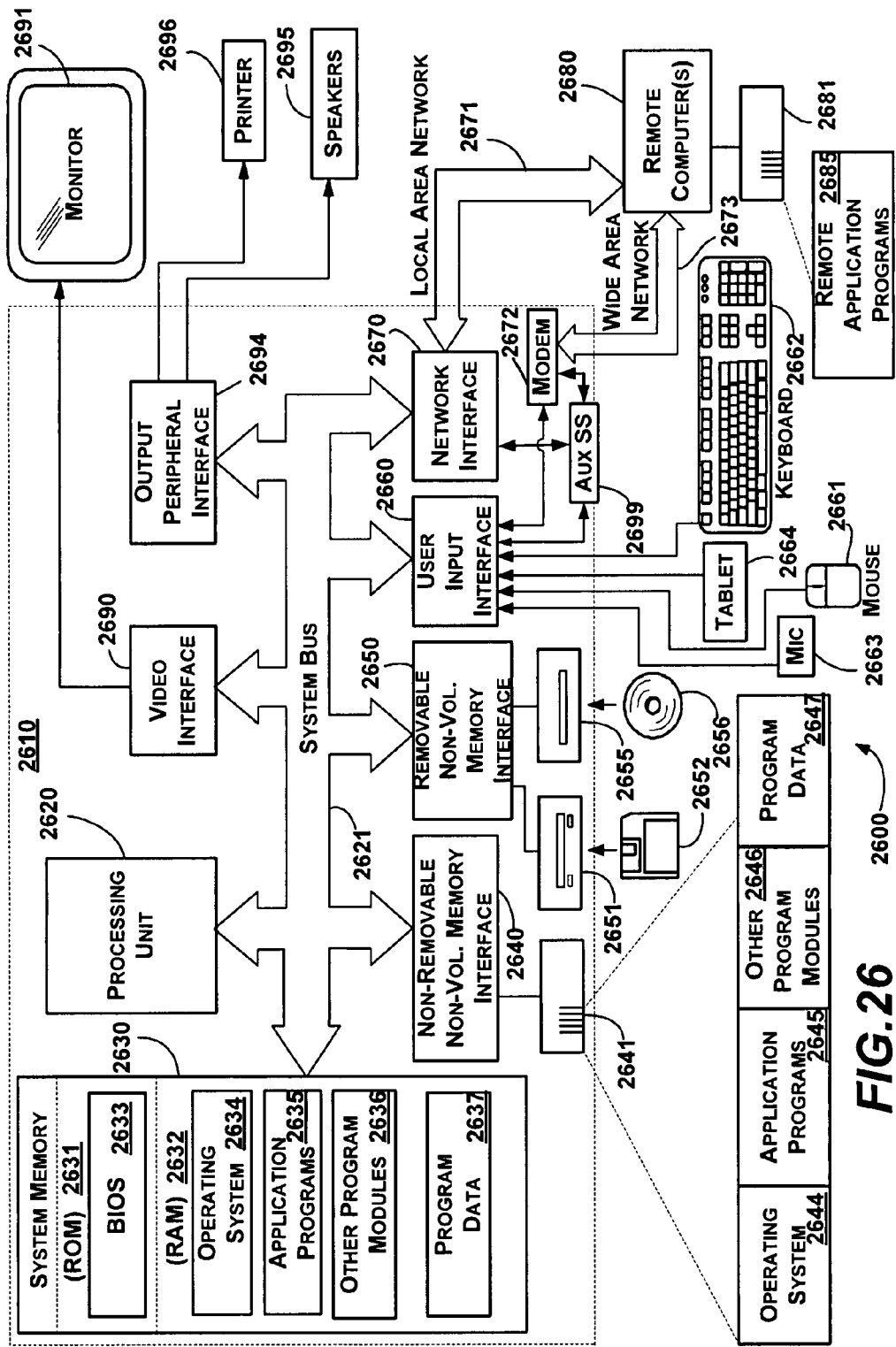
FIG. 26 shows an illustrative example of a general-purpose network computing environment into which various aspects of the present invention may be incorporated.

FIG. 26 illustrates an example of a suitable computing system environment 2600 on which the unified digital ink recognizer of FIG. 1 may be implemented. The computing system environment 2600 is only one example of a suitable computing environment and is not intended to suggest any limitation as to the scope of use or functionality of the invention. Neither should the computing environment 2600 be interpreted as having any dependency or requirement relating to any one or combination of components illustrated in the exemplary operating environment 2600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 26, an exemplary system for implementing various aspects of the invention may include a general purpose computing device in the form of a computer 2610. Components of the computer 2610 may include, but are not limited to, a processing unit 2620, a system memory 2630, and a system bus 2621 that couples various system components including the system memory to the processing unit 2620. The system bus 2621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 2610 typically includes a variety of computer-readable media. Computer-readable media can be any available media that can be accessed by the computer 2610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 2610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 2630 includes computer storage media in the form of volatile and/or nonvolatile memory such as read only memory (ROM) 2631 and random access memory (RAM) 2632. A basic input/output system 2633 (BIOS), containing the basic routines that help to transfer information between elements within computer 2610, such as during start-up, is typically stored in ROM 2631. RAM 2632 typically contains data and/or program modules that are immediately accessible to and/or presently being operated on by processing unit 2620. By way of example, and not limitation, FIG. 26 illustrates operating system 2634, application programs 2635, other program modules 2636 and program data 2637.

The computer 2610 may also include other removable/non-removable, volatile/nonvolatile computer storage media. By way of example only, FIG. 26 illustrates a hard disk drive 2641 that reads from or writes to non-removable, nonvolatile magnetic media, a magnetic disk drive 2651 that reads from or writes to a removable, nonvolatile magnetic disk 2652, and an optical disk drive 2655 that reads from or writes to a removable, nonvolatile optical disk 2656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2641 is typically connected to the system bus 2621 through a non-removable memory interface such as interface 2640, and magnetic disk drive 2651 and optical disk drive 2655 are typically connected to the system bus 2621 by a removable memory interface, such as interface 2650.

The drives and their associated computer storage media, described above and illustrated in FIG. 26, provide storage of computer-readable instructions, data structures, program modules and other data for the computer 2610. In FIG. 26, for example, hard disk drive 2641 is illustrated as storing operating system 2644, application programs 2645, other program modules 2646 and program data 2647. Note that these components can either be the same as or different from operating system 2634, application programs 2635, other program modules 2636, and program data 2637. Operating system 2644, application programs 2645, other program modules 2646, and program data 2647 are given different numbers herein to illustrate that, at a minimum, they are different copies. A user may enter commands and information into the computer 2610 through input devices such as a tablet, or electronic digitizer, 2664, a microphone 2663, a keyboard 2662 and pointing device 2661, commonly referred to as mouse, trackball or touch pad. Other input devices not shown in FIG. 26 may include a joystick, game pad, satellite dish, scanner, or the like. These and other input devices are often connected to the processing unit 2620 through a user input interface 2660 that is coupled to the system bus, but may be connected by other interface and bus structures, such as a parallel port, game port or a universal serial bus (USB). A monitor 2691 or other type of display device is also connected to the system bus 2621 via an interface, such as a video interface 2690. The monitor 2691 may also be integrated with a touch-screen panel or the like. Note that the monitor and/or touch screen panel can be physically coupled to a housing in which the computing device 2610 is incorporated, such as in a tablet-type personal computer. In addition, computers such as the computing device 2610 may also include other peripheral output devices such as speakers 2695 and printer 2696, which may be connected through an output peripheral interface 2694 or the like.

The computer 2610 may operate in a networked environment using logical connections to one or more remote computers, such as a remote computer 2680. The remote computer 2680 may be a personal computer, a server, a router, a network PC, a peer device or other common network node, and typically includes many or all of the elements described above relative to the computer 2610, although only a memory storage device 2681 has been illustrated in FIG. 26. The logical connections depicted in FIG. 26 include one or more local area networks (LAN) 2671 and one or more wide area networks (WAN) 2673, but may also include other networks. Such networking environments are commonplace in offices, enterprise-wide computer networks, intranets and the Internet.

When used in a LAN networking environment, the computer 2610 is connected to the LAN 2671 through a network interface or adapter 2670. When used in a WAN networking environment, the computer 2610 typically includes a modem 2672 or other means for establishing communications over the WAN 2673, such as the Internet. The modem 2672, which may be internal or external, may be connected to the system bus 2621 via the user input interface 2660 or other appropriate mechanism. A wireless networking component 2674 such as comprising an interface and antenna may be coupled through a suitable device such as an access point or peer computer to a WAN or LAN. In a networked environment, program modules depicted relative to the computer 2610, or portions thereof, may be stored in the remote memory storage device. By way of example, and not limitation, FIG. 26 illustrates remote application programs 2685 as residing on memory device 2681. It may be appreciated that the network connections shown are exemplary and other means of establishing a communications link between the computers may be used.

An auxiliary subsystem 2699 (e.g., for auxiliary display of content) may be connected via the user interface 2660 to allow data such as program content, system status and event notifications to be provided to the user, even if the main portions of the computer system are in a low power state. The auxiliary subsystem 2699 may be connected to the modem 2672 and/or network interface 2670 to allow communication between these systems while the main processing unit 2620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions, which when executed perform steps, comprising:
   a) extracting features from a selected sample of a plurality of samples of digital ink training data, wherein the digital ink training data corresponds to digital ink representative of at least two different types of digital ink input, each of the plurality of samples belong to one of a plurality of classes having combined feature data, and each of the plurality of samples is associated with a label comprising a recognition value;
   b) processing a feature dataset of the selected sample into a recognition model by adjusting the combined feature data of the class to which the selected sample belongs and maintaining data representative of the features extracted from the selected sample in association with the recognition value associated with the selected sample;
   c) selecting another sample from the plurality of samples and repeating steps a) and b) until each sample of the plurality of samples has been processed; and
   d) providing a unified recognizer that recognizes an input item of one of the at least two different types of digital ink input without mode selection or recognition parameter input, the input item being recognized by extracting features of the input item and determining a matching class having combined feature data that best match features of the input item, and outputting a matching recognition value associated with the matching class.

2. The computer-readable storage medium of claim 1 wherein maintaining the data representative of the features comprises maintaining information representative of the features corresponding to multiple dimensions.

3. The computer-readable storage medium of claim 1 having further computer-executable instructions, which when executed perform steps, comprising:
   processing the features from the plurality of samples to select useful features to effectively represent the at least two different types of digital ink.

4. The computer-readable storage medium of claim 1 wherein determining the matching class comprises a multi-dimensional nearest neighbor search.

5. The computer-readable storage medium of claim 1 having further computer-executable instructions, which when executed perform steps, comprising:
prior to step d), evaluating accuracy or efficiency, or both accuracy and efficiency of the recognizer model using a plurality of samples of digital ink testing data.

6. The computer-readable storage medium of claim 1 having further computer-executable instructions, which when executed perform steps, comprising:
evaluating accuracy or efficiency of the recognizer model, analyzing the evaluation of the accuracy or efficiency, or the evaluation of both the accuracy and efficiency, and using a plurality of samples of digital ink tuning data to improve recognition accuracy or efficiency of the recognizer model, or both recognition accuracy and efficiency.

7. The computer-readable storage medium of claim 1 having further computer-executable instructions, which when executed perform steps, comprising:
dividing samples of digital ink into the plurality of samples of digital ink training data, testing data and tuning data.

8. The computer-readable storage medium of claim 1 having further computer-executable instructions, which when executed perform steps, comprising:
defining a dataset of items the unified recognizer will recognize, including customized data items.

9. The computer-readable storage medium of claim 8 having further computer-executable instructions, which when executed perform steps, comprising:
mapping each item of the dataset to a label comprising a Unicode value, including mapping the customized data items to a private Unicode values.

10. In a computing environment, a system comprising:
a feature extraction mechanism that featurizes digital ink training data corresponding to training samples that represent at least two different types of digital ink data to be recognized by building a classifier according to the at least two different types of digital ink data to be recognized, the training samples belonging to a plurality of classes having features;
a recognition model builder mechanism coupled to the feature extraction mechanism that builds a recognition model including by persisting data representative of the features of each class of the training samples in association with a recognition value of each class of the training samples; and
an evaluation mechanism that evaluates the recognition model with respect to digital ink testing data corresponding to testing samples.

11. The system of claim 10 wherein the evaluation mechanism provides evaluation results corresponding to accuracy or efficiency, or both the accuracy and efficiency of the recognition model, and further comprising an error analysis mechanism that tunes the recognition model with respect to digital ink tuning data corresponding to tuning samples based at least in part on the evaluation results.

12. The system of claim 10 wherein the different types of digital ink data include handwritten characters, sketched shapes, handwritten gestures, or drawn pictures, or any combination of handwritten characters, sketched shapes, handwritten gestures, or drawn pictures.

13. The system of claim 10 further comprising a unified recognizer that uses the recognition model to recognize an input item.

14. The system of claim 10 wherein the data representative of the features comprises information corresponding to multiple dimensions for use in a nearest neighbor search.

15. The system of claim 10 wherein the features of each of the plurality of classes are extracted from a collection of samples for each of the plurality of classes, the system further comprising:
a unified recognizer that recognizes new digital ink items using a feature of the new digital ink item that is matched to an individual feature of the plurality of classes.

16. In a computing environment, a method comprising:
determining a dataset having digital ink items representative of a plurality of different classes of digital ink data to be recognized;
building a classifier according to the plurality of different classes of the digital ink data to be recognized by extracting features for the plurality of different classes of the digital ink data from samples of the plurality of different classes;
using features of the classifier corresponding to the digital ink items to build a unified digital ink recognizer for two or more different types of the digital ink data;
receiving an input item; and
recognizing the input item with the unified digital ink recognizer to output a value associated with one of the two or more different types of the digital ink data.

17. The method of claim 16 wherein building the classifier further comprises, evaluating the classifier using digital ink testing data, and modifying the classifier using digital ink tuning data.

18. The method of claim 16 wherein recognizing the input item with the unified digital ink recognizer to output the value associated with the one of the two or more different types of the digital ink data comprises outputting a Unicode value from a private use area of Unicode mapped to a custom item for an individual type of digital ink data.

19. The method of claim 16 further comprising, defining at least one custom item that the unified recognizer will recognize and mapping the custom item to a private use area of Unicode.

20. The method of claim 16, further comprising:
dividing the samples into a training set for building the classifier, a testing set for testing the classifier and a tuning set for tuning the classifier.

* * * * *

UNITED STATES PATENT AND TRADEMARK OFFICE
CERTIFICATE OF CORRECTION

| | | |
|---|---|---|
| PATENT NO. | : 8,041,120 B2 | Page 1 of 1 |
| APPLICATION NO. | : 11/821858 | |
| DATED | : October 18, 2011 | |
| INVENTOR(S) | : Dongmei Zhang et al. | |

It is certified that error appears in the above-identified patent and that said Letters Patent is hereby corrected as shown below:

In column 9, line 26, in Claim 8, before "the" insert -- that --.

In column 9, line 33, in Claim 9, after "to" delete "a".

In column 10, line 52, in Claim 20, delete "classifier" and insert -- classifier, --, therefor.

Signed and Sealed this
Sixth Day of December, 2011

David J. Kappos
*Director of the United States Patent and Trademark Office*